(12) United States Patent
McLaughlin et al.

(10) Patent No.: US 11,797,317 B1
(45) Date of Patent: Oct. 24, 2023

(54) TRANSITIONING LEGACY SOFTWARE TO BE PROVABLY CORRECT

(71) Applicant: Amazon Technologies, Inc., Seattle, WA (US)

(72) Inventors: Sean McLaughlin, Seattle, WA (US); Tongtong Xiang, Seattle, WA (US); Matthias Schlaipfer, Berlin (DE); Neha Rungta, San Jose, CA (US); Serdar Tasiran, Greenport, NY (US); John Byron Cook, Brooklyn, NY (US); Michael William Whalen, Edina, MN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/548,225

(22) Filed: Dec. 10, 2021

(51) Int. Cl.
   *G06F 9/445* (2018.01)
   *G06F 11/36* (2006.01)
   *G06F 8/60* (2018.01)
   *G06F 8/41* (2018.01)

(52) U.S. Cl.
   CPC .......... *G06F 9/44589* (2013.01); *G06F 8/44* (2013.01); *G06F 8/60* (2013.01); *G06F 11/3608* (2013.01); *G06F 11/3612* (2013.01)

(58) Field of Classification Search
   CPC .... G06F 8/40–54; G06F 8/60; G06F 9/44589; G06F 11/3608; G06F 11/3612
   See application file for complete search history.

(56) References Cited

U.S. PATENT DOCUMENTS

| 9,274,928 | B1 | 3/2016 | Conrad et al. |
| 9,904,614 | B2 | 2/2018 | Stevens et al. |
| 10,225,309 | B1 | 3/2019 | Rosenzweig et al. |

(Continued)

FOREIGN PATENT DOCUMENTS

| CN | 106528100 | 6/2020 |

OTHER PUBLICATIONS

Leavens, Gary T., et al., Roadmap for Enhanced Languages and Methods to Aid Verification, GPCE '06: Proceedings of the 5th international conference on Generative programming and component engineering, Oct. 2006, 15 pages, [retrieved on Jan. 19, 2023], Retrieved from the Internet: <URL:http://dl.acm.org/>.*

(Continued)

*Primary Examiner* — Geoffrey R St Leger
(74) *Attorney, Agent, or Firm* — S. Scott Foster; Kowert, Hood, Munyon, Rankin & Goetzel, P.C.

(57) ABSTRACT

A software development process may support a transition from unverifiable, legacy code to verifiable code that is provably correct by construction. A behavioral model may be developed for legacy software that includes various behavioral criteria. Then, source code implemented in a verifiable language may be verified using the behavioral model to perform verification. Once the source code is complete and verified, a new verified implementation may be compiled. The verified implementation may then be executed, along with the legacy software, to identify differences in behavior which are fed back into the behavioral model and subsequently into the new source code. This process may then be iterated with the verifiable code being deployable once behavioral differences are resolved.

20 Claims, 7 Drawing Sheets

(56) References Cited

U.S. PATENT DOCUMENTS

| | | | |
|---|---|---|---|
| 2007/0277163 A1* | 11/2007 | Avresky | G06F 8/43 |
| | | | 717/146 |
| 2017/0039039 A1* | 2/2017 | Johnson | G06F 11/3604 |
| 2018/0075231 A1 | 3/2018 | Subramanian et al. | |
| 2018/0352002 A1 | 12/2018 | Ramachandran et al. | |
| 2021/0034343 A1* | 2/2021 | Sistany | G06F 9/44589 |
| 2021/0165641 A1* | 6/2021 | Gilpin | G06F 8/76 |

OTHER PUBLICATIONS

Linders, Ben, Developing Provably-Correct Software Using Formal Methods, InfoQ, May 22, 2015, 5 pages, [retrieved on Jan. 19, 2023], Retrieved from the Internet: <URL:https://www.infoq.com/news/2015/05/provably-correct-software/>.*

Duo-labs, "AWS IAM liniting library," Sep. 13, 2019,pp. 1-9.

* cited by examiner

TRANSITIONING LEGACY SOFTWARE TO BE PROVABLY CORRECT

BACKGROUND

A cloud provider, or other provider network, may implement multiple network-based services. These services may provide different functionality, such as computational resources, storage resources, data transmission, among various others. These services are commonly written in non-verifiable programming languages and evolve over time to become difficult to maintain and improve. New programming language tools have been developed that enable software to be provably correct by construction, however these tools do not add provable correctness to legacy code developed in other programming languages.

Figure 1:
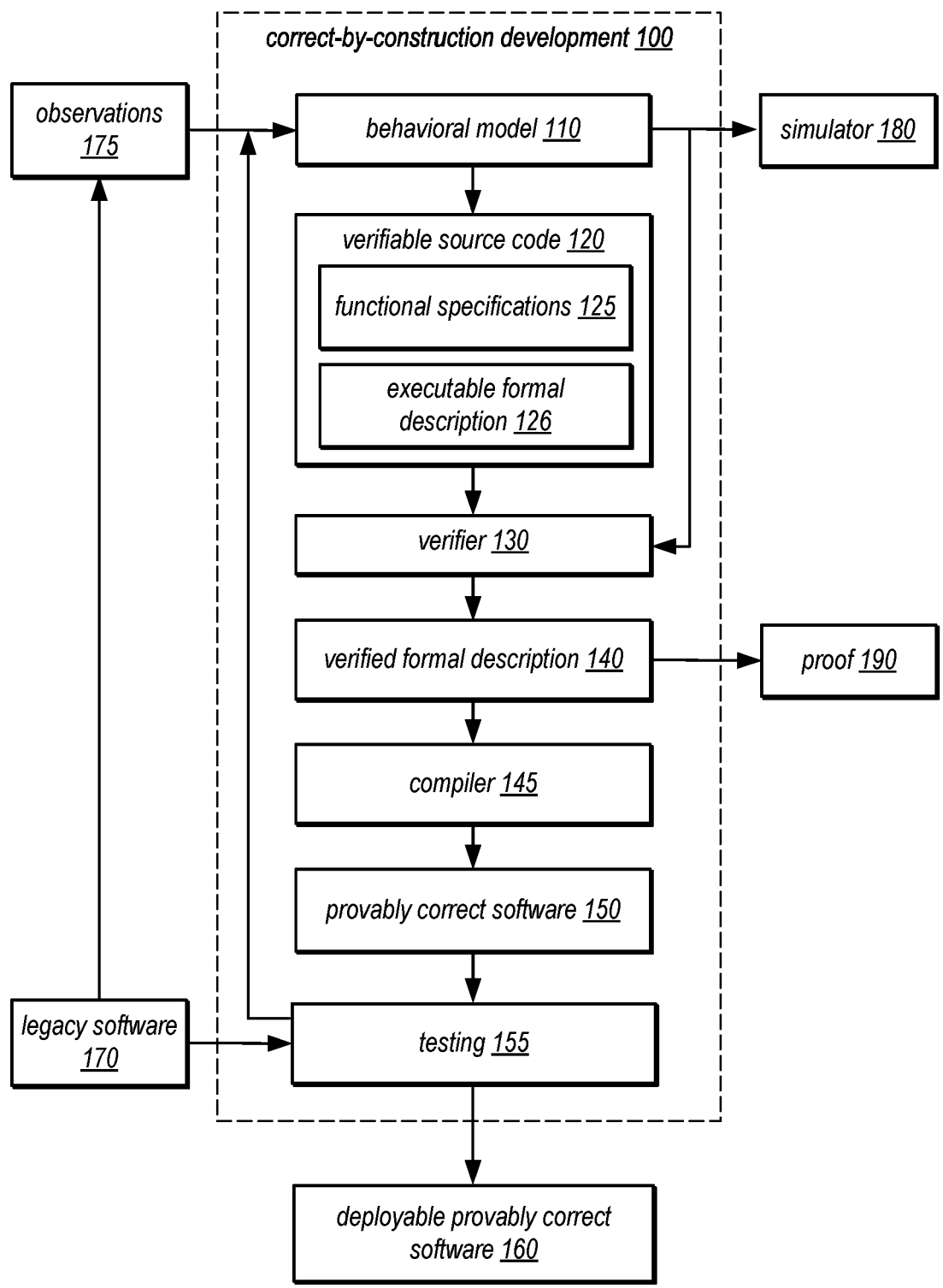
FIG. 1 illustrates a logical block diagram of a correct-by-construction software development process.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various techniques for transitioning legacy software to verifiably correct software using correct-by-construction techniques are described herein. Legacy software, in particular mission critical software or software deployed to large numbers of users such as in cloud services software, may evolve over time to become increasingly difficult to maintain and increasingly risky to improve. Often times, correctness of such software may become difficult to characterize and behaviors difficult to predict. In particular, complexity of such software may cause users to have expectations of software behavior that are difficult to communicate or guarantee, causing these users to be unable to successfully configure legacy software to meet their requirements due to the complex nature of the software behavior. An example of such software is identity and access management software for providing clients access to cloud services.

To address these challenges, systems and methods for transitioning legacy software to verifiably correct software are described herein. This verifiably correct software may provide mathematical precision and certainty in meeting behavioral objectives. First, formal semantics, referred to below as behavioral models, of the verifiably correct software may be written in the form of mathematical logic formula(s). Second, an automated, reasoning-backed process for producing verifiable code based on executable formal descriptions of the formal semantics may, through iterative refinement, generate a drop-in replacement for the legacy software. This verifiable code may be generated from high-level algorithms formally verified against the formal semantics.

The resultant replacement for the legacy software may provide a formally assured path from customer intent to the software code that executes that intent. This ensures that a provable end-to-end guarantee remains intact and that the behavior of the software is preserved as the software evolves and new features are introduced. Correctness of the software may then be guaranteed with respect to the behavioral model with compatibility with legacy software maintained (and behavior of the legacy software fully documented). Furthermore, future development of software features may be accelerated due to regression of changes being performed automatically by the verification process.

FIG. 1 illustrates a logical block diagram of a correct-by-construction software development process, according to some embodiments. Correct-by-construction software development 100 may include authoring of a behavioral model 110 and verifiable source code 120 developed in a verifiable programming language, the verifying of the source code 120 in a verifier 130 to produce a verified formal description 140, compiling of the verified formal description 140 in a compiler 145 for the verifiable programming language to produce provably correct software 150, the provably correct software 150 then tested in a testing module against the behavior of legacy software 170 that is used to author the behavioral model 110 through observation 175.

It may be desired to develop deployable provably correct software 150 to replace legacy software 170. To begin, the legacy software 170 may be analyzed to generate a behavioral model, or specification, 110 using observations 175. Observations may include analysis of legacy source code, characterization of executable behavior of the legacy software, and so forth and may be performed in any combination of manual and machine-automated methods. The behavioral model 110 may include a number of behavioral criteria or constraints and may be machine readable, in some embodiments, to serve as the basis for evaluation by software development tools. The behavioral model 110 may, in some embodiments, include logic formulas that can be represented visually as decision diagrams. All or portions of the behavioral model 110 may be incorporated into verifiable source code 120, in some embodiments, and may be extractable for use outside the correct-by-construction development process 100. An example of usage of the behavioral model 110 outside the correct-by-construction development process 100 is shown in the simulator 180 which is discussed in greater detail below in FIGS. 3-5.

In some embodiments, portions of the behavioral model 110 may be incorporated into the verifiable source code 120 and additional behavioral criteria (not shown) added to further specify functions within the verifiable source code 120 to generate functional specifications 125 for the verifiable source code 120. Implemented in the verifiable source code 120 is a verifiable executable formal description 126 of the behavioral model 110.

The verifiable source code 120, including the incorporated functional specifications 125 and the executable formal description 126, may then be provided to a verifier 130 along with the behavioral model 110. This verifier 130 may be stand-alone software development tool, in some embodiments, or may be integrated into a source code authoring tool, such as an Integrated Development Environment (IDE), that provide continuous or on-demand verification of all or portions of the verifiable source code 120. The verifier 130 may be implemented in a variety of ways in various embodiments and these examples are not intended to be limiting.

The verifier 130 may then process the verifiable source code 120 using various techniques, such as static analysis, to analyze the correctness of the verifiable source code 120; feeding back information to refine the verifiable source code 120 until the verifiable source code is verified. Once the verifiable source code 120 is verified, the verifier 130 may generate a verified formal description 140 which may be provided to a compiler 145. This compiler 145 may be stand-alone software development tool, in some embodiments, or may be integrated into a software development tool, such as an IDE, that provide continuous or on-demand compilation of all or portions of the verifiable source code 120. The compiler 145 may be implemented in a variety of ways in various embodiments and these examples are not intended to be limiting.

The verified formal description 140 may then, in some embodiments, be made available, along with verification data (not shown), as proof 190 of the formal correctness and behavior of the resulting provably correct software.

The compiler 145 may receive the verified formal description 140 in a verifiable language and output code in a variety of forms, in various embodiments. In some embodiments, the compiler 145 may output code that may be directly executed by a processor or be linked with executable libraries to form an executable application. In some embodiments, the compiler 145 may output code that may be directly executed or may be combined with other software to be directly executed within a virtual machine environment such as in generating Java bytecode suitable for executing within a Java Virtual Machine (JVM). In still other embodiments, the compiler 145 may output code that is human-readable and editable to allow for source code auditing, testing and review, with the output source code then compiled by the same compiler or another compiler to generate executable code. In some embodiments, the compiler 145 may directly or indirectly output executable code in a same executable format as legacy software 170. Doing so may enable more rapid testing 155 and deployment 160. It should be noted that the compiler 145 may output code in a variety of ways in various embodiments and these examples are not intended to be limiting.

The compiling of the verified formal description 140 by the compiler 145 may then generate provably correct software 150. This software 150 can then be demonstrated to meet the behavioral criteria of the behavioral model 110. However, errors or deficiencies in the creation of the behavioral model 110 or in observations 175 may lead to differences of behavior of the provably correct software 150 with respect to the legacy software 170. Therefore, testing 155 may employ executing of both provably correct software 150, which meets the criteria of the behavioral model 110, and legacy software 170 under matching conditions, or in a mirrored or synchronous fashion receiving real time inputs, to detect differences in behavior between the two software implementations. Any detected differences in behavior between the two software implementations may then be fed back to the refine the behavioral model 110, resulting in one or more iterations of the correct-by-construction development process 100.

Once testing 155 exposes no differences in behavior between the two software implementations, development of the behavioral model 110 has been shown to fully describe the behavior of legacy software 170. At this point, the provably correct software 150 may be deployed to replace the legacy software 170 as deployable probably correct software 160.

Figure 2:
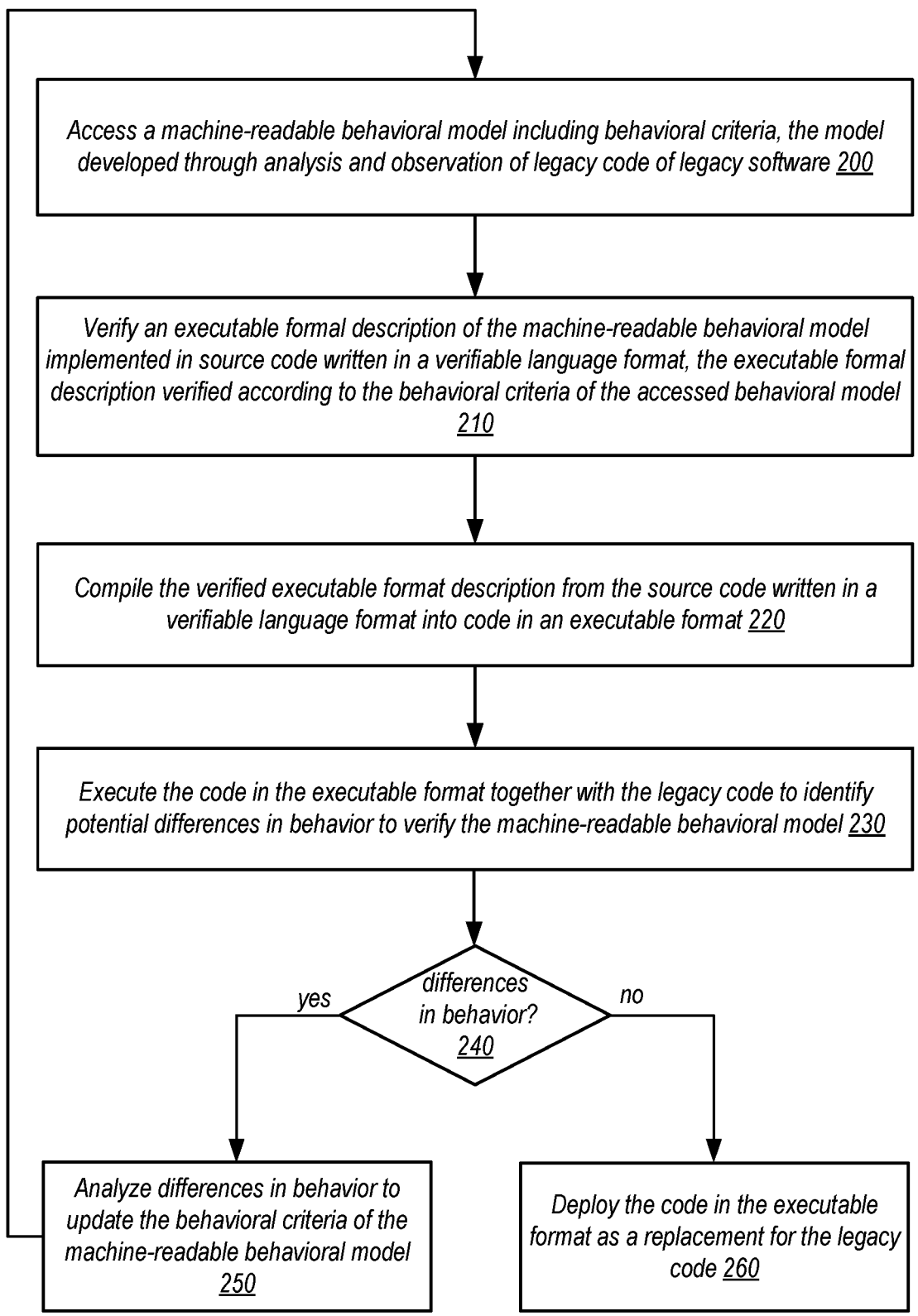
FIG. 2 is a high-level flowchart illustrating various methods and techniques to implement a correct-by-construction software development process, according to some embodiments.

FIG. 2 is a high-level flowchart illustrating various methods and techniques to implement a correct-by-construction software development process, according to some embodiments. The process begins at step 200 where a machine-readable behavioral model, such as the behavioral model 110 of FIG. 1, may be accessed, the machine-readable behavioral model including behavioral criteria or constraints, to verify an executable formal description, such as the executable formal description 126 of FIG. 1. To generate the behavioral model, legacy software, such as the legacy software 170 of FIG. 1, may be analyzed to generate a number of observations, such as the observations 175 as shown in FIG. 1, the observations including analysis of legacy source code, characterization of executable behavior of the legacy software, and so forth.

The behavioral model 110 may be machine readable, in some embodiments, to serve as the basis for evaluation by software development tools. The behavioral model 110 may, in some embodiments, include logic formulas that can be represented visually as decision diagrams.

The process may then continue to step 210 where the executable formal description may be verified using the accessed behavioral model, in some embodiments. The executable formal description, such as the executable formal description 126 of FIG. 1, may be expressed as source code in a verifiable language or format, such as the verifiable source code 120 of FIG. 1. This verification may be performed, in some embodiments, by a verification tool, such as the verifier 130 of FIG. 1, and the verification may be performed according to the behavioral criteria of the accessed behavioral model. The verification tool may, in some embodiments, be stand-alone software development tool or may be integrated into a source code authoring tool, such as an Integrated Development Environment (IDE), that provide continuous or on-demand verification of all or portions of the verifiable source code of the executable formal description. The verification tool may be implemented in a variety of ways in various embodiments and these examples are not intended to be limiting.

The verification too may then verify the executable formal description to generate a verified formal description, such as the verified formal description 140 of FIG. 1, which may be provided to a compiler, such as the compiler 145 of FIG. 1. This compiler may be stand-alone software development tool, in some embodiments, or may be integrated into a software development tool, such as an IDE, that provide continuous or on-demand compilation of all or portions of the verifiable source code. The compiler may be implemented in a variety of ways in various embodiments and these examples are not intended to be limiting.

As shown in step 220, The compiler may receive the verified formal description in a verifiable language and output code in a variety of forms, in various embodiments. In some embodiments, the compiler may output code that may be directly executed by a processor or be linked with executable libraries to form an executable application. In some embodiments, the compiler may output code that may be directly executed or may be combined with other software to be directly executed within a virtual machine environment such as in generating Java bytecode suitable for executing within a Java Virtual Machine (JVM). In still other embodiments, the compiler may output code that is human-readable and editable to allow for source code auditing, testing and review, with the output source code then compiled by the same compiler or another compiler to generate executable code. In some embodiments, the compiler may directly or indirectly output executable code in a same executable format as the legacy software. Doing so may enable more rapid testing and deployment. It should be noted that the compiler may output code in a variety of ways in various embodiments and these examples are not intended to be limiting.

The compiling of the verified formal description by the compiler may then generate provably correct software that may be demonstrated to meet the behavioral criteria of the behavioral model, in some embodiments However, differences of behavior may exist between the provably correct software and the legacy software.

As shown in 230, the code in the executable format implementing the provably correct software may be executed together with the legacy code, such as in testing 155 of FIG. 1, to detect differences in behavior between the two software implementations. If any detected differences in behavior exist, as shown in a positive exit from step 240, the process may continue to step 250 where, in some embodiments, differences in behavior may be analyzed to update the behavioral criteria of the machine-readable behavioral model.

If, however, no detected differences in behavior exist, as shown in a negative exit from step 240, the process may continue to step 260 where, in some embodiments, the code in the executable format may be deployed to replace the legacy software, such as shown in 160 of FIG. 1.

Figure 3:
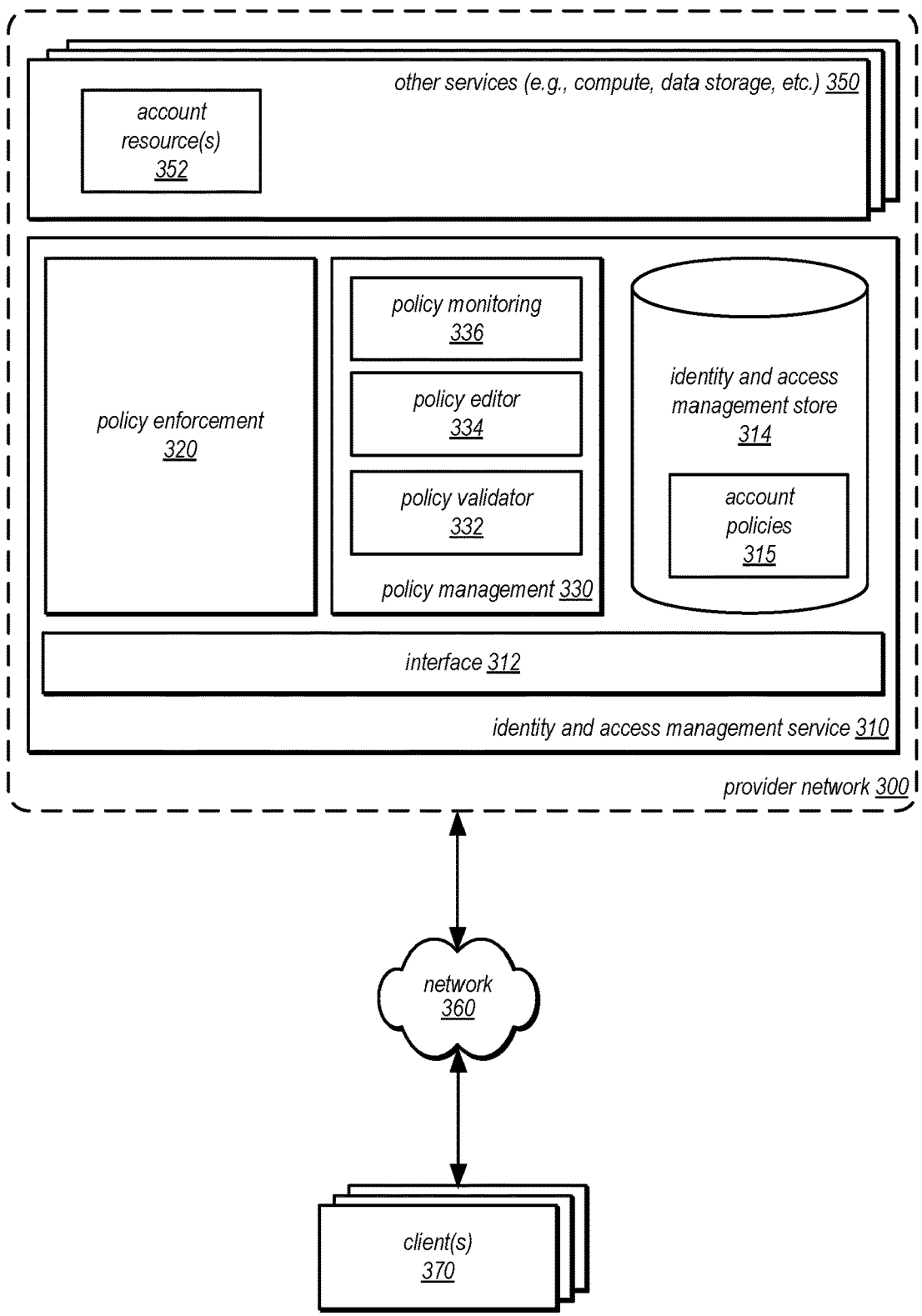
FIG. 3 is a logical block diagram illustrating a provider network implementing exemplary legacy software for transitioning using a correct-by-construction software development process, according to some embodiments.

FIG. 3 is a logical block diagram illustrating a provider network implementing exemplary legacy software for transitioning using a correct-by-construction software development process, according to some embodiments. In various embodiments, a provider network 200 may be a private or closed system or may be set up by an entity such as a company or a public sector organization to provide one or more services (such as various types of cloud-based storage, processing, or other computing resources) accessible via the Internet and/or other networks to clients 370. The provider network may be implemented in a single location or may include numerous data centers hosting various resource pools, such as collections of physical and/or virtualized computer servers, storage devices, networking equipment and the like (e.g., computing system 2000 described below with regard to FIG. 7), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, such as provider network regions, where a region may be a separate geographical area in which the provider network clusters or manages data centers, in some embodiments. Each region 300 may include two or more availability zones (sometimes referred to as fault tolerant zones) connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Clients 370 can connect to availability zones of the provider network via a publicly accessible network (e.g., the Internet, a cellular communication network). Regions may be connected to a global network which includes private networking infrastructure (e.g., fiber connections controlled by the cloud provider) connecting each region to at least one other region. The provider network may deliver content from points of presence outside of, but networked with, these regions 300 by way of edge locations and regional edge cache servers. This compartmentalization and geographic distribution of computing hardware enables the provider network to provide low-latency resource access to customers on a global scale with a high degree of fault tolerance and stability.

In some embodiments, a provider network may implement various computing resources or services across one or more regions, such as identity and management service 310 and other services 350, which may include a virtual compute service, data processing service(s) (e.g., map reduce, data flow, and/or other large scale data processing techniques), data storage services (e.g., object storage services, block-based storage services, database services, or data warehouse storage services) and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network 300, which may be provisioned in user accounts, in some embodiments.

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system 2000 illustrated in FIG. 7 and described below. In various embodiments, the functionality of a given system or service component (e.g., a component of identity and access management services 310 or other services 350) may be implemented by a particular node or may be distributed across several nodes. In some embodiments, a given node may implement the functionality of more than one service system component (e.g., more than one data store component).

Identity and access management service 310 may implement resource state validation of access management policies and other validation techniques. Identity and access management service 310 may provide operators of other services 350 and auditing/monitoring service 340, with the ability to enforce access controls for various types of users and various roles of users associated with an account according to the identity determined for and shared by identity and access management service 310. For example, identity and access management service 310 can provide fine-grained access controls to different service resources, support different authentication techniques or protocols, such as multi-factor authentication (MFA), support analysis or tools for specifying access controls, and integration features for external or alternative identity and access control mechanisms, in some embodiments. User controls may be implemented to determine what, wherein, and when users can access resources and how the resources may be used by users, including federated users to provide management for groups of users and/or roles which may support features like single sign-on (SSO), in some embodiments.

Identity and access management service 310 may implement interface 312. Interface 312 may be a programmatic interface (e.g., supporting one or more APIs), graphical (e.g., providing a web-based console or other graphical control), and/or command line interfaces, in various embodiments, to allow for the specification and management of various identity and access management service 310 features, including creating, editing, and validating access management policies as discussed below with regard to FIG. 4 for performing access operations.

Identity and access management service 310 may implement policy enforcement 320, in various embodiments. For example, various access control management policies may be specified and enforced for different account resource(s) 352 in other services 350. Policy enforcement 320 may serve as an authorization and access control for various requests, operations, or other actions taken with respect to account resources by various users, accounts, roles, and/or other identities by enforcing access management policies according to the various features specified in the access management policies. For example, policy enforcement 320 may interpret these policies, determine whether and what resources and actions are within the scope of a policy and provide access control information to other services in order for other services to allow or deny requests directed to account resource(s) 352. Identity and access management store 314 may store the created and enforced account policies 315, in various embodiments.

In various embodiments, policy management 330 may implement policy editor 334. As discussed in detail below with regard to FIG. 4, various interfaces and/or interactions may be used to allow users to create, edit, and/or remove access management policies. In this way, users can take advantage of the flexible and customizable features of access control policies to tailor access control management for specific scenarios in an account. As noted below, policy editor 334 may, in some embodiments, invoke policy validator 332 (which may be sometimes referred to as a policy linter), in order to provide feedback that can be made through policy editor 334.

Figure 6:
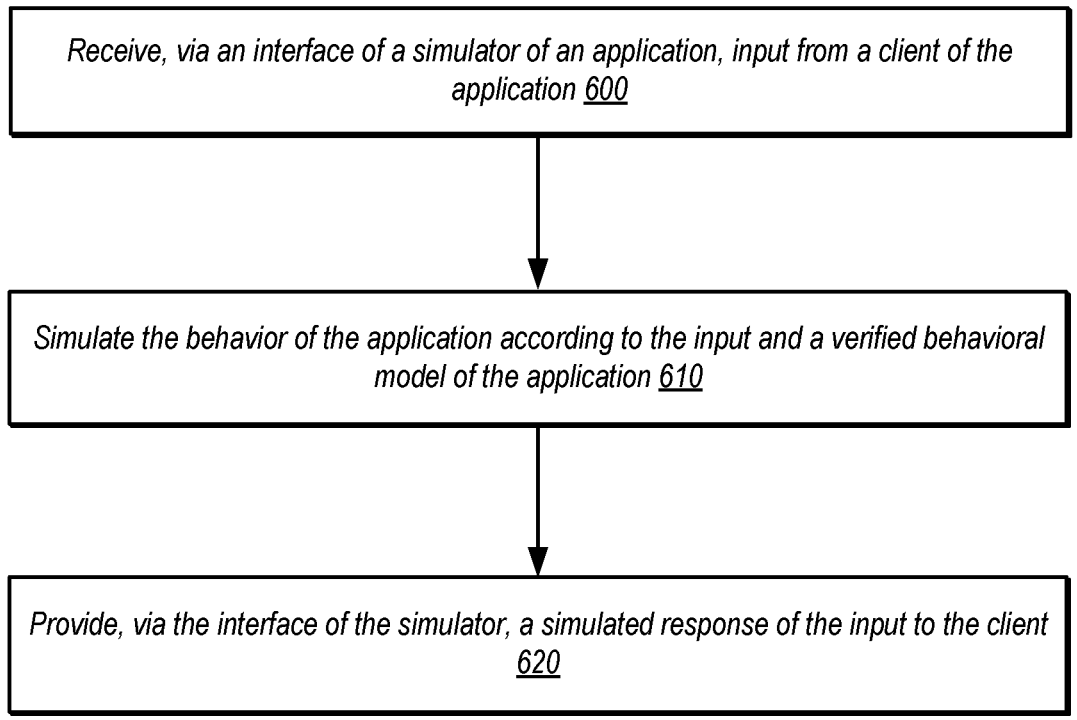
FIG. 6 is a high-level flowchart illustrating various methods and techniques to simulate responses of a verifiably correct application to input using a behavioral model, according to some embodiments.

Because errors in policies can lead to unintended consequences when enforced (e.g., being overly permissive or restrictive upon operations), policy management 330 may implement policy validator 332, in some embodiments. In this way, policy validator 332 can provide a user with feedback to correct, modify, or optimize that would otherwise lead to undesirable outcomes when a given access management policy was enforced. In a correct-by-construction implementation of identify and access management service 310, a behavioral model, such as the behavioral model 110 of FIG. 1, may be used in some embodiments, to implement policy validator 332 using behavioral simulation, such as through simulator 180 as shown in FIG. 1. FIG. 6 below provides a discussion of such simulation of behaviors responsive to inputs such as policy validation.

In some embodiments, policy management 330 may implement policy monitoring 336. Policy monitoring 336 may further adapt the performance of policy management to handle changes in other services 350 features (e.g., new or different actions, modifications to parameters or output of actions, etc.) and/or changes to resources (e.g., the addition of new resources). Policy monitoring may provide indications of detected changes that effect existing policies so that policy editor 334 could be used (if necessary) to edit an existing policy to account for a detected change.

Generally speaking, clients 370 may encompass any type of client configurable to submit network-based requests to provider network regions 300 via network 360, including requests for other services 350 (e.g., a request to create a database, start a computation job, setup a data stream, etc.).

In some embodiments, operators of a service (e.g., service 350) may be a client 370 that performs requests to specify quorum controls and/or access control operations, in some embodiments. For example, a given client 370 may include a suitable version of a web browser, or may include a plug-in module or other type of code module configured to access a management console to specify quorum controls and/or access control operations. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 370 may be an application configured to interact directly with provider network region 300. In some embodiments, client 370 may be configured to generate network-based services requests according to a Representational State Transfer (REST)-style network-based services architecture, a document- or message-based network-based services architecture, or another suitable network-based services architecture. Although clients 370 are illustrated as external to provider network 300, in some embodiments clients of different services, like other services 350, can be implemented within provider network region 300 (e.g., implemented on a resource of another service 350, such as virtual compute instance).

Clients 370 may convey network-based services requests to and receive responses from provider network regions 300 via network 360. In various embodiments, network 360 may encompass any suitable combination of networking hardware and protocols necessary to establish network-based-based communications between clients 370 and provider network regions 300. For example, network 360 may generally encompass the various telecommunications networks and service providers that collectively implement the Internet. Network 360 may also include private networks such as local area networks (LANs) or wide area networks (WANs) as well as public or private wireless networks. For example, both a given client 370 and provider network region 300 may be respectively provisioned within enterprises having their own internal networks. In such an embodiment, network 360 may include the hardware (e.g., modems, routers, switches, load balancers, proxy servers, etc.) and software (e.g., protocol stacks, accounting software, firewall/security software, etc.) necessary to establish a networking link between given client 370 and the Internet as well as between the Internet and provider network region 300. It is noted that in some embodiments, clients may communicate with provider network region 300 using a private network rather than the public Internet.

Figure 4:
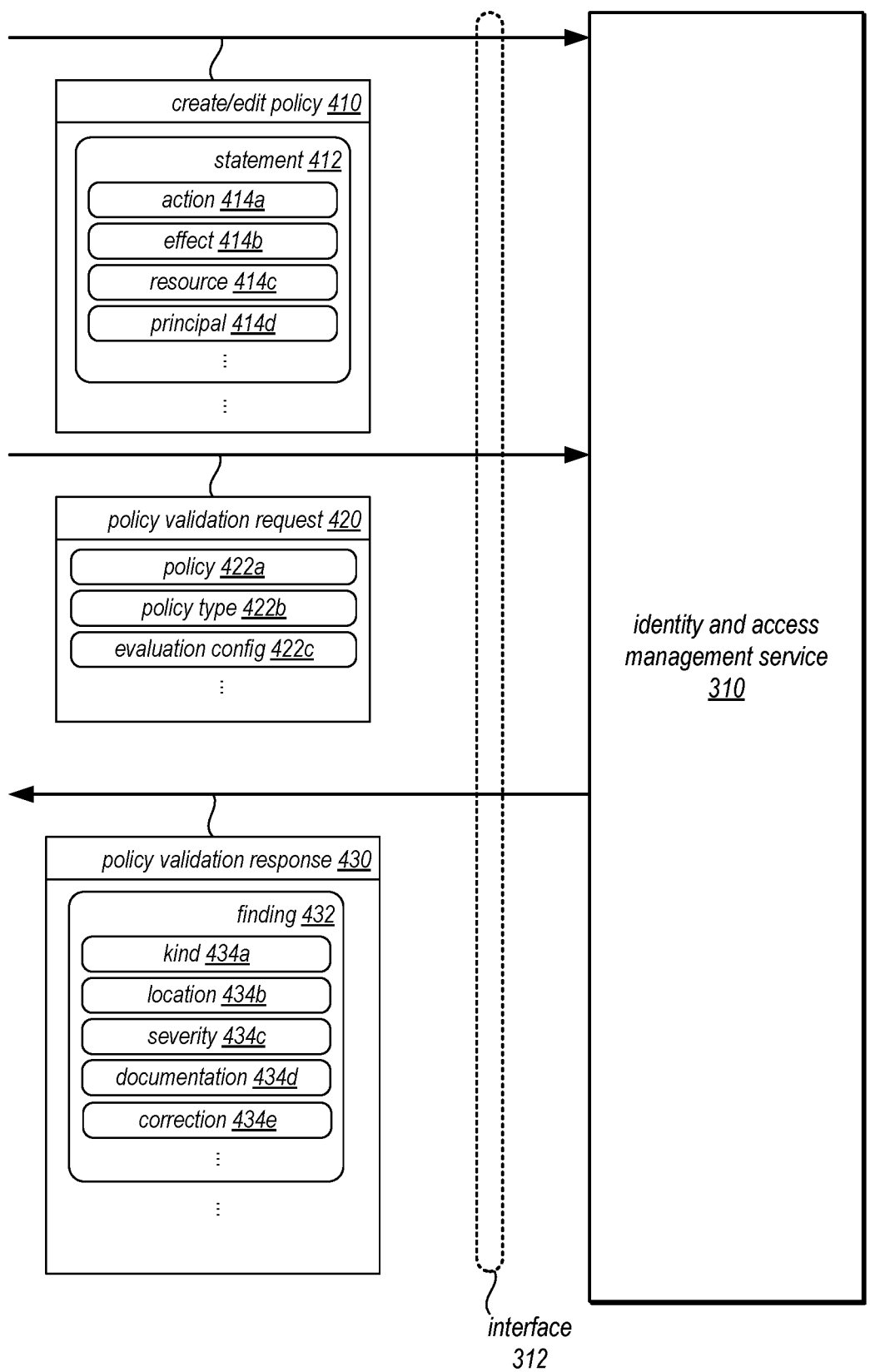
FIG. 4 illustrates example interactions to create, edit, and validate an access control policy at an access and identity management service, according to some embodiments.

As noted earlier, identity and access management service 310 may implement an interface to manage access management policies enforced by identity and access management service 310. FIG. 4 illustrates example interactions to create, edit, and validate an access control policy at an access and identity management service, according to some embodiments. Various requests to create and/or edit a policy, as indicated 410 may be supported via interface 312. For example, policies may include various features included in one or more statements 412, such as action 414a (e.g., service actions allowed or denied by a policy), effect 414b (e.g., allows or denies actions), resource 414c (e.g., resource identifier, name or other information which the policy is attached), principal 414d (e.g., an account, user, role, or other mechanism for making access decisions to allow or deny, among others (e.g., policy language version, conditions, identifiers for statements, etc.). These features of a policy can be specified and then validated according to the various techniques discussed below.

As indicated at 420, a policy validation request may be supported via interface 312 and handled by policy validator 332 as discussed in detail below. For example, a policy validation request may identify the policy 422a (e.g., by identifier or include the policy, such as the policy statements, to validate), policy type 422b, (e.g., identity-based policy, resource-based policy, permission boundary policy, service control policy, access control list, session policy, etc.), and/or various validation configuration information 422c (e.g., policy language version, policy error suppression configuration, which may specify various features of a finding that should be suppressed, such as the finding features discussed below). For example, a suppression configuration may allow a user to tailor the findings of the policy validator to ignore known or non-useful results. For instance, a suppression configuration can suppress findings that match all of the specified suppression criteria (e.g., kind, label, service, and/or severity) included in the suppression configuration.

As indicated at 430, a response to a policy validation may include various features to provide, among other information, a correction. For example, response 430 may include one or more findings 432, that pertain to portions of the policy and include information such as a kind 434a (e.g., an identifier of the rule or other type of error found, including resource state-based errors), location 434b (e.g., location in policy of error), severity 434c (e.g., "suggestion," "warning," "error"), documentation 434d (e.g., location of documentation that discusses the error), correction 434e (e.g., suggested change, such as suggested correction based on resource state, ML model inference, etc.), among others.

FIG. 4 illustrates an example user interface that provides a suggested correction to an access control policy, according to some embodiments. Policy management interface 410 may be supported or implemented as part of interface 312 for identity and access management service 310, in some embodiments. Policy management interface 410 may provide various features to create, locate, edit, or remove policies. In some embodiments (not illustrated) policy management interface 410 may support visual (as opposed to a text-based) editor, that utilizes various fields, guided questions and/or user interface elements, presented options, symbols, or other features to generate a policy. Although FIG. 4 illustrates a text-based editor, similar features for indicating corrections, making corrections, and other interactions could be implemented using a visual editor.

Policy management interface 410 may implement various user interface elements to search for policies, as indicated at 442, in some embodiments. For example drop-down lists, search bars, or other search tools can be used (e.g., including tabular displays of existing policies) can be provided to locate a policy to edit. Policy management interface 410 may implement various user interface elements to create a policy, as indicated at 444, in some embodiments. For example, a visual editor or other guided process can be triggered or a text-based editor to manually enter the policy may be provided. As indicated at 446, in various embodiments policy management interface Policy editor 420 may be implemented in order to provide a space to view a policy, in some embodiments. For example, policy 422 may be displayed in a text-based editing format, allowing a user to use a cursor, keyboard, and/or other text entry tools create and edit a policy. As discussed above with regard to FIG. 3, a policy may, in some embodiments, include various statements, as illustrated in FIG. 4. Policy editor 420 may implement one or more user interface elements to submit a request to validate the policy, as indicated at 432, which may include various features similar to those discussed above with regard to FIG. 3. Various validation results may be provided, including various findings coded using different symbols, colors, highlighting or other graphical features. As indicated at 424, an interactive indication of a suggestion to correct a portion of policy 422 may be triggered by the location of a pointer or other cursor over a highlighted portion, which may provide a suggested correction to the portion of the policy. Edits made in response to the validation (or other edits not prompted by an validation) may be saved for the policy using one or more interface elements 434, in some embodiments.

Figure 5:
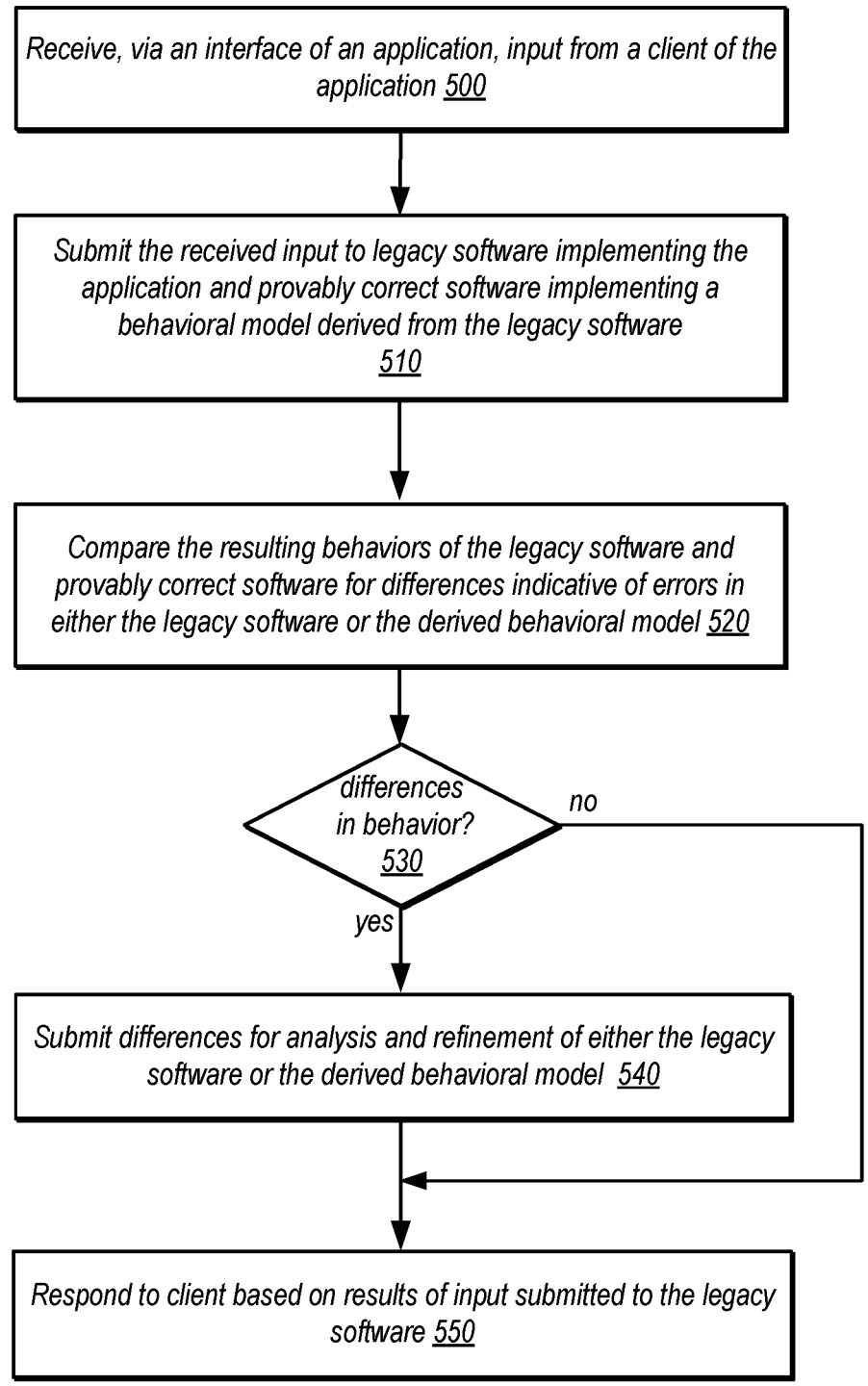
FIG. 5 is a high-level flowchart illustrating various methods and techniques to implement testing of a behavioral model of legacy code, according to some embodiments.

FIG. 5 is a high-level flowchart illustrating various methods and techniques to implement testing of a behavioral model of legacy code, according to some embodiments. The process begins at step 500 where input may be received from a client of an application via a programmatic interface. This application may be implemented in legacy software, such as the legacy software 170 of FIG. 1, and in provably correct software, such as the provably current software 150 of FIG. 1, that is compiled from a formal description, such as the verified formal description 140 of FIG. 1, that has been verified using a behavioral model, such as the behavioral model 110 of FIG. 1, derived from the legacy software. The application may be, for example, identity and access management service 310 as shown in FIGS. 3 and 4 and the received input may be, for example, a policy validation request 420 as shown in FIG. 4.

Then, as shown in 510, the received input may be submitted in some embodiments to both legacy software implementing the application and provably correct software implementing the behavioral model derived from the legacy software. By submitting the received input to both the provably correct software, which meets criteria of the behavioral model, and the legacy software under matching conditions, or in a mirrored or synchronous fashion receiving client inputs, any differences in behavior may between the two software implementations, in some embodiments.

As shown in 520, the resulting behaviors of the legacy software and the provably correct software may then be compared, in some embodiments, for differences indicative of errors in either the legacy software or the derived behavioral model. Should differences in behavior be determined, as shown in a positive exit from 530, the process may proceed to 540. If differences in behavior are not determined, as shown in a negative exit from 530, the process may proceed to 550.

As shown in 540, differences in behavior may be analyzed to determine the cause. Should the cause be an error in the behavioral model, the difference information may be fed back to improve the behavioral model, as discussed earlier with regard to FIG. 1. If the cause, on the other hand, is an error in the legacy code, in some embodiments the difference information may be used to improve the legacy code while in other embodiments the difference information may be ignored. Upon completion of the analysis and submission, the process may proceed to step 550.

As shown in 550, the application may then respond to the client based on results of the input submitted to the legacy software. The process is then complete.

FIG. 6 is a high-level flowchart illustrating various methods and techniques to simulate responses of a verifiably correct application to input using a behavioral model, according to some embodiments. The process begins at step 600 where input may be received from a client of an application via a programmatic interface of a simulator of the application. This application may be implemented in provably correct software, such as the provably current software 150 of FIG. 1, that is compiled from a formal description, such as the verified formal description 140 of FIG. 1, that has been verified using a behavioral model, such as the behavioral model 110 of FIG. 1. The application may be, for example, identity and access management service 310 as shown in FIGS. 3 and 4 and the received input may be, for example, a policy validation request 420 as shown in FIG. 4.

Then, as shown in 610, the simulator, such as the simulator 180 as shown in FIG. 1, may simulate the behavior of the application using a verified behavioral model, such as the behavioral model 110 of FIG. 1, and the received client input, in some embodiments. Then, as shown in 620, the simulated response to the client input may be provided, via the interface of the simulator, to the client.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
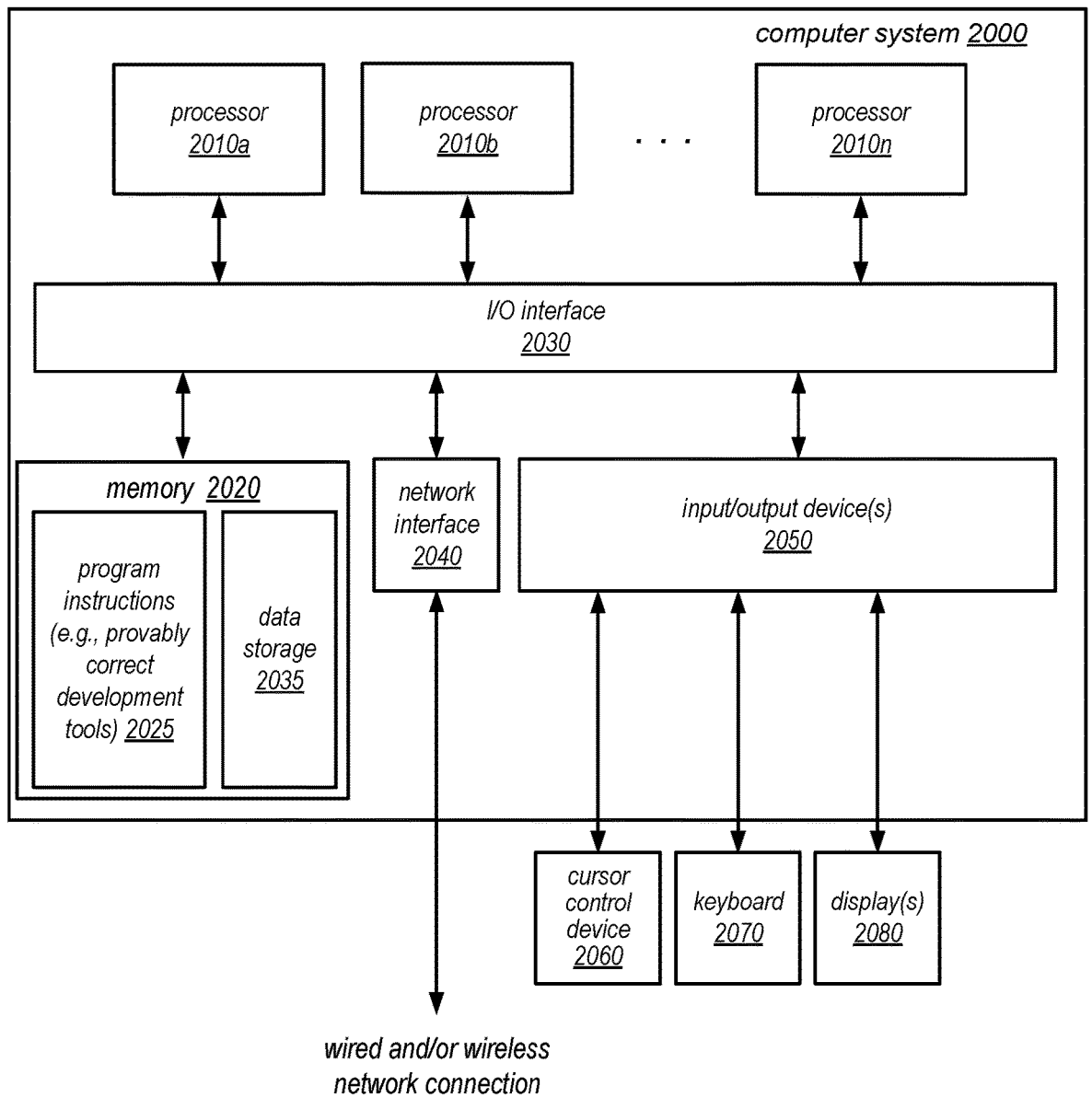
FIG. 7 illustrates an example system configured to implement the various methods, techniques, and systems described herein, according to some embodiments.

Embodiments of resource state validation of access control policies as described herein may be executed on one or more computer systems, which may interact with various other devices. One such computer system is illustrated by FIG. 7. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., policy validators and/or other features of identity and access control systems, services or other systems that implement resource state validation of access control policies) are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 7, memory 2020 may include program instructions 2025, configured to implement the various methods and techniques as described herein, and data storage 2035, comprising various data accessible by program instructions 2025. In one embodiment, program instructions 2025 may include software elements of embodiments as described herein, such as a provably correct software development tools, validators or other policy validation techniques, identity and access management services and other legacy software as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement an identity and access management service for a provider network, the identity and access management service configured to:
   access a machine-readable behavioral model comprising a plurality of behavioral criteria determined at least in part according to legacy code in an executable format;
   verify source code in a verifiable format according to the plurality of behavioral criteria of the accessed machine-readable behavioral model, the source code implementing an executable formal description of the machine-readable behavioral model;
   compile the verified source code in the verifiable format to verified code in the executable format;
   execute the verified code in the executable format and the legacy code in the executable format to verify the machine-readable behavioral model; and
   update the machine-readable behavioral model responsive to identifying a difference in behavior between executing of the verified code in the executable format and executing the legacy code in the executable format.

2. The system of claim 1, wherein the accessing, verifying, compiling, executing and updating are performed for an execution cycle of a plurality of execution cycles of a code development system.

3. The system of claim 1, wherein the identity and access management service is further configured to deploy the verified code in the executable format to replace the legacy code in the executable format subsequent to completion of the plurality of execution cycles of a code development system.

4. The system of claim 1, wherein the identity and access management service is further configured to:
   receive an identity and access management policy from a client of a service provider; and
   simulate behavior of the received policy according to the machine-readable behavioral model.

5. A method, comprising:
   accessing a machine-readable behavioral model determined at least in part according to legacy code in an executable format;

verifying source code in a verifiable format according to the accessed machine-readable behavioral model;

compiling the verified source code in the verifiable format to verified code in the executable format; and executing the verified code in the executable format and the legacy code in the executable format to verify the machine-readable behavioral model.

6. The method of claim 5, further comprising updating the machine-readable behavioral model responsive to identifying a difference in behavior between executing of the verified code in the executable format and executing the legacy code in the executable format.

7. The method of claim 6, wherein the accessing, verifying, compiling, executing and updating are performed for an execution cycle of a plurality of execution cycles of a code development system.

8. The method of claim 7, further comprising deploying the verified code in the executable format to replace the legacy code in the executable format subsequent to completion of the plurality of execution cycles of a code development system.

9. The method of claim 5, wherein the executable format complies with a Java bytecode specification executable in a Java virtual machine.

10. The method of claim 9, wherein the compiling the verified source code in the verifiable format to verified code in the executable format comprises:

compiling the verified source code in the verifiable format to verified source code in an intermediate, human-readable format; and compiling the verified source code in the human-readable format to verified code in the executable format.

11. The method of claim 5, wherein the verified code in the executable format and the legacy code in the executable format are access management code implementing access management policies at an identity and access management system of a service provider.

12. The method of claim 11, further comprising:

receiving an identity and access management policy from a client of a service provider; and simulating behavior of the received policy according to the machine-readable behavioral model.

13. One or more non-transitory, computer-readable storage media, storing program instructions that when executed on or across at least one processor cause the at least one processor to implement:

accessing a plurality of behavioral criteria determined at least in part according to legacy code in an executable format;

verifying an executable formal description in a verifiable format according to the accessed plurality of behavioral criteria;

compiling the verified executable formal description in the verifiable format to verified code in the executable format; and executing the verified code in the executable format and the legacy code in the executable format to verify the plurality of behavioral criteria.

14. The one or more non-transitory, computer-readable storage media of claim 13, storing further instructions that when executed on or across the at least one processor, cause the at least one processor to further implement updating the plurality of behavioral criteria responsive to identifying a difference in behavior between executing of the verified code in the executable format and executing the legacy code in the executable format.

15. The one or more non-transitory, computer-readable storage media of claim 14, wherein the accessing, verifying, compiling, executing and updating are performed for an execution cycle of a plurality of execution cycles of a code development system.

16. The one or more non-transitory, computer-readable storage media of claim 15, storing further instructions that when executed on or across the at least one processor, cause the at least one processor to further implement deploying the verified code in the executable format to replace the legacy code in the executable format subsequent to completion of the plurality of execution cycles of a code development system.

17. The one or more non-transitory, computer-readable storage media of claim 13, wherein the executable format complies with a Java bytecode specification executable in a Java virtual machine.

18. The method of claim 17, wherein the compiling the verified source code in the verifiable format to verified code in the executable format comprises:

compiling the verified source code in the verifiable format to verified source code in an intermediate, human-readable format; and compiling the verified source code in the human-readable format to verified code in the executable format.

19. The one or more non-transitory, computer-readable storage media of claim 13, wherein the verified code in the executable format and the legacy code in the executable format are access management code implementing access management policies at an identity and access management system of a service provider.

20. The method of claim 19, storing further instructions that when executed on or across the at least one processor, cause the at least one processor to further implement:

receiving an identity and access management policy from a client of a service provider; and simulating behavior of the received policy according to the plurality of behavioral criteria.

* * * * *